United States Patent [19]

Munroe et al.

[11] Patent Number: 5,280,614
[45] Date of Patent: Jan. 18, 1994

[54] APPARATUS AND METHOD FOR CONTROLLING ACCESS TO DATA USING DOMAINS

[75] Inventors: Steven J. Munroe; James G. Ranweiler; George D. Timms, Jr., all of Rochester, Minn.

[73] Assignee: International Business Machines Corporation, Armonk, N.Y.

[21] Appl. No.: 570,477

[22] Filed: Aug. 21, 1990

[51] Int. Cl.⁵ .................. G06F 9/46; G06F 13/00
[52] U.S. Cl. .................. 395/650; 364/DIG. 1; 364/254.2; 364/254.3; 364/281.7; 364/246.7; 364/246.8; 364/246.6
[58] Field of Search .................. 395/650; 364/254.2, 364/254.3, 246.7, 246.8, 246.6

[56] References Cited

U.S. PATENT DOCUMENTS

4,525,780  6/1985  Bratt et al. .................. 364/200
4,545,012  10/1985  Clancy et al. .................. 364/200

Primary Examiner—Gareth D. Shaw
Assistant Examiner—A. Katbab
Attorney, Agent, or Firm—Roy W. Truelson

[57] ABSTRACT

In an object-based computer system, each object is contained in, and each task executes in, a protection domain. Domains exist at several hierarchical domain levels, some levels having multiple discrete domains, while others have one common domain. A task may access an object if the domain in which the task is executing is the same as the domain containing the object, or if the domain in which it is executing occupies a higher hierarchical domain level than the domain containing the object. Each object includes a domain attribute, which is a numerical value defining the domain in which it is contained. The domain attribute of the currently executing task is stored in a domain register. When an attempt is made to access data within an object, the domain attribute of the object is compared with the domain attribute stored in the domain register. If the access conditions are met, access is permitted.

26 Claims, 5 Drawing Sheets

APPARATUS AND METHOD FOR CONTROLLING ACCESS TO DATA USING DOMAINS

FIELD OF THE INVENTION

The present invention relates to computer system integrity, and in particular to controlling the rights given to tasks executing on the computer system to access data in the system's memory.

DESCRIPTION OF THE PRIOR ART

Modern mainframe computer systems are typically multi-tasking, i.e., they service a number of users performing various tasks simultaneously. As used herein, "task" refers to a process executing on behalf of a user. The "task" should be distinguished from the machine instructions ("program" or "procedure"), which govern its execution. "Programs" and "procedures" are both sets of machine-readable instructions, but "program" usually implies a self-contained set which governs some work, while "procedure" sometimes implies a set that is called from other programs or procedures. As used herein, no distinction will be made between a "program" and a "procedure", and the term "procedure" should be understood to include self-contained procedures or "programs". A task will commonly invoke several procedures to accomplish its purpose, although only one procedure will be executed at any one time. It is possible for a single procedure to be utilized simultaneously by different users, or even multiple simultaneous times by the same user, so that each usage is a separate task, even though only one copy of the procedure (i.e. the machine instructions) may exist in system memory. An "object" is an addressable collection of data contained on the system, either in system memory or mass storage. Since data can include machine instructions, the term "object" includes programs and procedures.

Because a single computer system is performing multiple tasks, the tasks necessarily must share system hardware, such as the central processing unit (CPU), system memory, storage, etc. Typically, only one task is running in the CPU at any instant in time. However, system memory and storage are allocated among the tasks in varying amounts, which are continually changing. The system hardware has the capability to access any location in memory or storage. Absent some restriction, the task running in the CPU could access (and alter) memory or storage allocated to some other task, destroying the ability of the other task to successfully complete. Therefore, since the advent of multi-tasking systems, protection mechanisms have been utilized to limit the ability of an individual task to access all the data available on the system.

One approach to data integrity has been to create a number of discrete domains. A domain is an entity which has defined boundaries and defined barriers to the flow of data across the boundaries. In its implementation, it may exist as an address range, a physical area of memory, a collection of objects with a particular attribute, or in some other form. In a discrete domain system, data is contained in, and tasks execute in, discrete domains. A task can access data contained in its domain, but no others. Because it would be impossible to perform operating system functions without universal access, such a system must in addition have some mechanism whereby certain privileged tasks are given universal authority to access data throughout the system.

The IBM System/360 computer is an example of the discrete domain approach. Each location in memory and each task is associated with a protection key between 0 and 15. Key 0 is a universal access key, assigned to privileged tasks. All user tasks execute in some other key, and may access only data associated with that key. When any write operation is executed by the CPU on behalf of a task not operating with the universal access key, the key of the currently executing task is checked against the key of the memory location to verify that they are the same; if not, the write operation is not permitted.

The discrete domain approach successfully shields data in one domain from a task executing in another, which could be used, e.g., to shield one user's data from another user. However, there are many environments in which it is desirable for a task to have access to another domain. Since there is no capability to directly access data in another domain, mechanisms must be added to the system if this capability is desired. Generally, this means that some operating system task will access the data on behalf of the user task, using a grant of authority from the data owner. Such mechanisms add complexity to the operating system and reduce performance.

Another method of enforcing system integrity is the use of hierarchical domains. A plurality of domains is established with a defined hierarchical relationship, such that a task in any domain can access data in its own domain, and in any domain which is lower in the hierarchy. Typically, such a system is implemented by assigning an integer value to each domain, and making a single comparison of the domain values to determine access rights. While this method solves some of the problems with the discrete domain approach, it creates others. In particular, it provides no mechanism whereby two users may simultaneously protect themselves from each other; either they share the same domain, in which case each is vulnerable to the other, or one user runs in a higher domain, in which case the other is vulnerable.

A different approach is used in object-based systems, such as the IBM System/38 computer and the IBM Application System/400 computer. In these systems, data is contained in objects, and the entire memory constitutes a single address space containing a number of objects, each object having a permanent address. There is only one protection domain for all user tasks and objects. Obviously, this approach makes it very easy for a user task to access data in an object belonging to another user, but at the same time, creates an integrity exposure. An additional mechanism is required to prevent unlimited, and potentially destructive, access. Object-based systems maintain integrity by restricting direct addressing of data within an object; data must be accessed by controlled reference to the object. In one prior art implementation, a request to access data within an object is channelled through one or more privileged procedures known as call-level interfaces, which verify authority to access the object from the object's access control data. Unfortunately, this implementation imposes a substantial performance burden, which is particularly acute in the case of programs written in pointer-based computer languages, such as PASCAL or C. Instead of directly accessing pointed to data, a separate procedure is invoked, requiring extra time for each pointer reference.

For performance reasons, it is desirable in an object-based architecture for a task to be able to access data directly, i.e., by means of a pointer to the address containing the data, without using the call-level interface to the object containing the data. One option is to use "secure" compilers to generate object code from pointer-based languages, on the assumption that these will prevent unauthorized access. However, it is nearly impossible to guarantee that a compiler will guard against all integrity exposures and at the same time permit legitimate access to data. Another option is to verify access rights with each attempted memory reference. However, this option causes additional performance degradation, unless the verification scheme is very primitive. Prior art does not teach simple and effective means for such access without creating an integrity exposure.

It is therefore an object of the present invention to provide an enhanced method and apparatus for controlling access to data in a computer system.

It is a further object of this invention to provide greater integrity for data in a computer system.

A still further object of this invention is to provide a more flexible integrity domain structure in a computer system.

It is also an object of this invention to provide greater integrity for objects in an object-based computer system.

Another object of this invention is to increase the performance of a computer system with data integrity protection, and in particular to increase the performance of an object-based computer system when accessing data contained in an object.

It is also an object to reduce the cost of a computer system providing data integrity protection.

SUMMARY OF THE INVENTION

In an object-based computer system, each object includes a domain attribute. The domain attribute is a numeric field, which is two bytes in the preferred embodiment. Each task executing on the system also is associated with a domain attribute. The highest representable number, FFFF (hex), represents the universal domain; objects in this domain have the most restrictive access, while tasks in this domain have universal access to objects throughout the system. The lowest representable number, 0001 (hex), represents the common problem domain; objects in this domain are accessible to any task running on the system. Additional hierarchical domain levels can be defined lying between the universal domain and the common problem domain. In the preferred embodiment, there are three additional levels. A common system domain, having a domain attribute of 8000 (hex), occupies one of the levels. All domains having attributes between 8001 (hex) and FFFE (hex) occupy another level, intermediate between the universal domain and the common system domain. Domains having attributes between 0002 (hex) and 7FFF (hex) occupy still another level, intermediate between the common problem domain and the common system domain.

The domain attribute of the currently executing task is stored in a domain register. When an attempt is made to access data within an object, the domain attribute of the object is compared with the domain attribute stored in the domain register. If the domain attributes are the same, or if the domain attribute in the domain register is at a higher hierarchical level, then access is permitted; otherwise it is not.

In the preferred embodiment, the address register consists of a base register and an offset register. The base register holds the high order bits of the address, while the offset register holds the low order bits. All addresses within a single base register address belong to a single object (although it is not necessarily true that these are the only addresses comprising the object). Whenever the base register is loaded to access a memory location outside the range of the current base register value, the domain attribute in the domain register is compared to the domain attribute of the object containing the address range being loaded to determine if access is permitted as described above. If access is permitted, the load operation is successful; otherwise the base address can not be loaded. Once the base address is loaded, it is not necessary to verify access rights with each subsequent memory access to the same base register address. Therefore, access verification in accordance with this invention is performed only once for all accesses within the offset register's address range.

DETAILED DESCRIPTION OF THE PREFERRED EMBODIMENT

Figure 1:
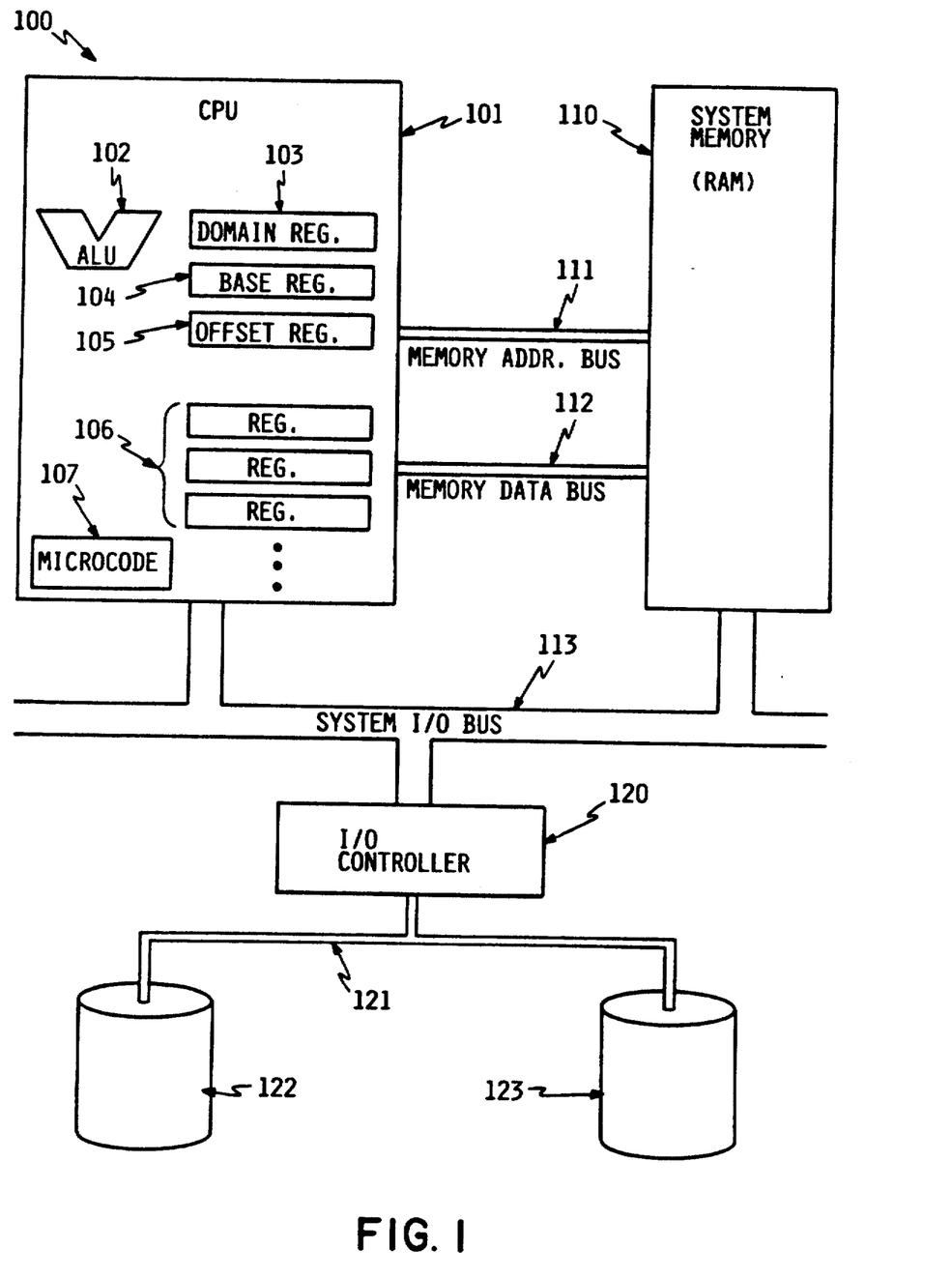
FIG. 1 shows the major components of a computer system according to the preferred embodiment of this invention.

A block diagram of the major components of computer system 100 of the preferred embodiment of the present invention is shown in FIG. 1. A central processing unit (CPU) 101 comprises an arithmetic/logic unit (ALU) 102, a microcode, control store 107 and a plurality of registers 103, 104, 105, 106, in particular a domain register 103, a base address register 104, and an offset address register 105. CPU 101 communicates with a random-access system memory 110 over a memory address bus 111 and a memory data bus 112. CPU 101 and system memory 110 are connected to a system I/O bus 113. An I/O Controller 120 is attached to system I/O bus 113, by which it communicates with CPU 101 and system memory 110. I/O Controller 120 controls access to non-volatile mass storage devices 122 and 123 through storage bus 121. While one I/O controller and two storage devices are shown in FIG. 1, it should be understood that the number of I/O controllers attached to system I/O bus 113, and the number of storage devices attached to each I/O controller, is variable. It should also be understood that additional I/O devices may be attached to system I/O bus 113, or multiple I/O buses may be attached to the system.

Figure 2:
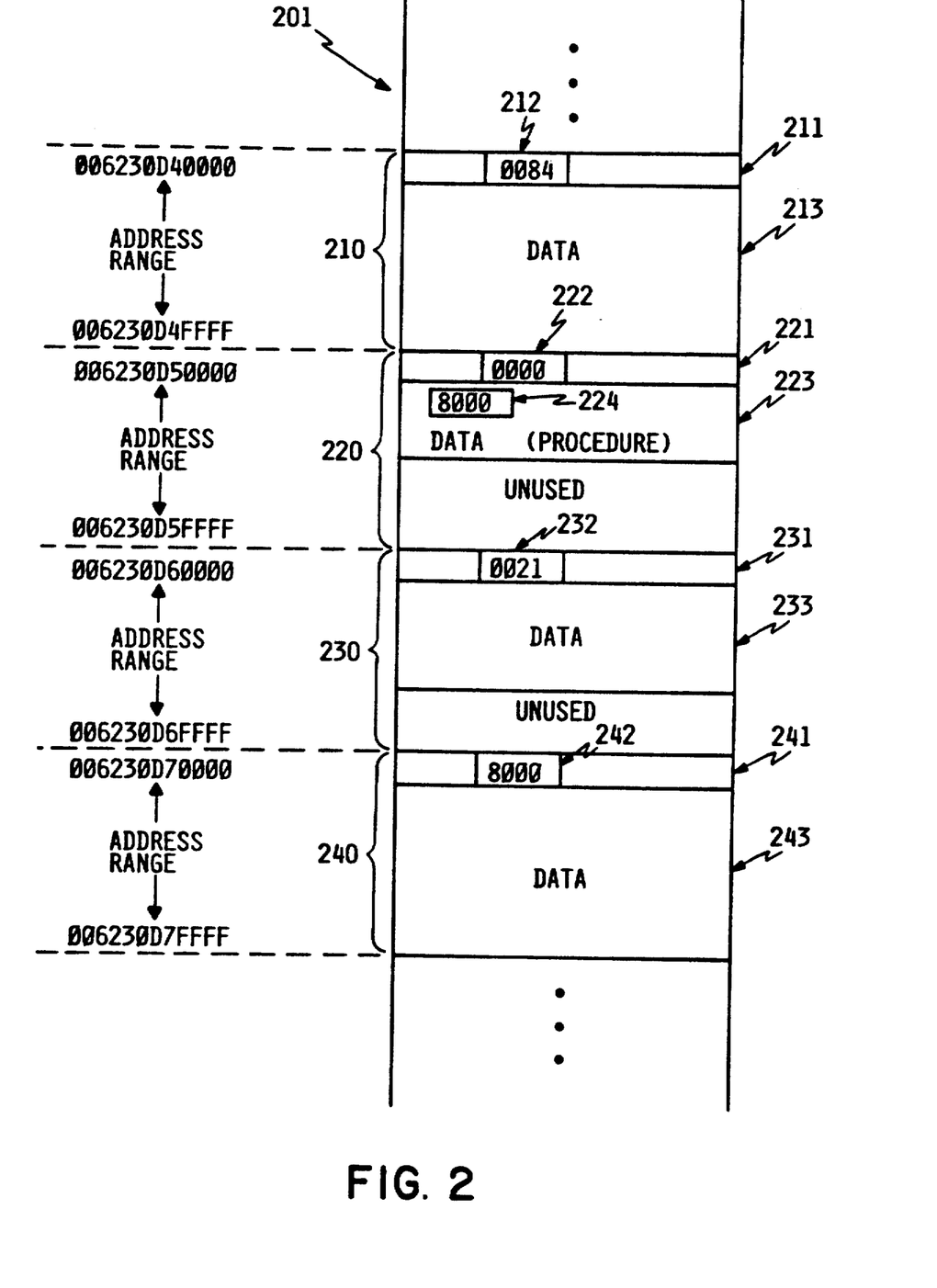
FIG. 2 shows a typical portion of the system's address space according to the preferred embodiment of this invention.

In the preferred embodiment, computer system 100 is an IBM AS/400 computer system, although other computer systems could be used. In this system, an address contains 48 bits, giving the system a large virtual address space 201. FIG. 2 shows a typical portion of the system's virtual address space 201. The number of addresses in the system's address space is much larger than the number of addressable locations physically present in memory or the storage devices. All data, including programs, stored on the system are contained in objects. When an object is created, it is permanently allocated a range of virtual memory addresses. Virtual memory addresses are allocated in segments 210, 220, 230, 240, each segment containing 64K addresses. The 32 high order bits of an address identify the segment, each segment consisting of those addresses with the same 32 high order address bits. The 16 low order bits of the address identify the offset of the address within the segment. The first 16 bytes of each segment are allocated to segment header 211, 221, 231, 241. Bytes 7 and 8 of the header contain domain attribute 212, 222, 232, 242 of the object to which the segment belongs. Data 213, 223, 233, 243, which may be machine instructions, follows segment header 211, 221, 231, 241.

Although an object may have more than one segment of the address space allocated to it, all addresses within any particular segment belong to the same object. The first segment of an object is a base segment; all other segments in the object contain a pointer to the base segment, identifying the object to which they belong (segments belonging to the same object are not necessarily contiguous). Because virtual memory is allocated in 64K segments, not all the address space will necessarily be used for data. Segments 220 and 230 are only partially used. Some segments contain procedures, i.e., sets of machine instructions. Segment 220 contains procedure 223. Each procedure 223 contains a 2-byte execution domain attribute 224.

Figure 3:
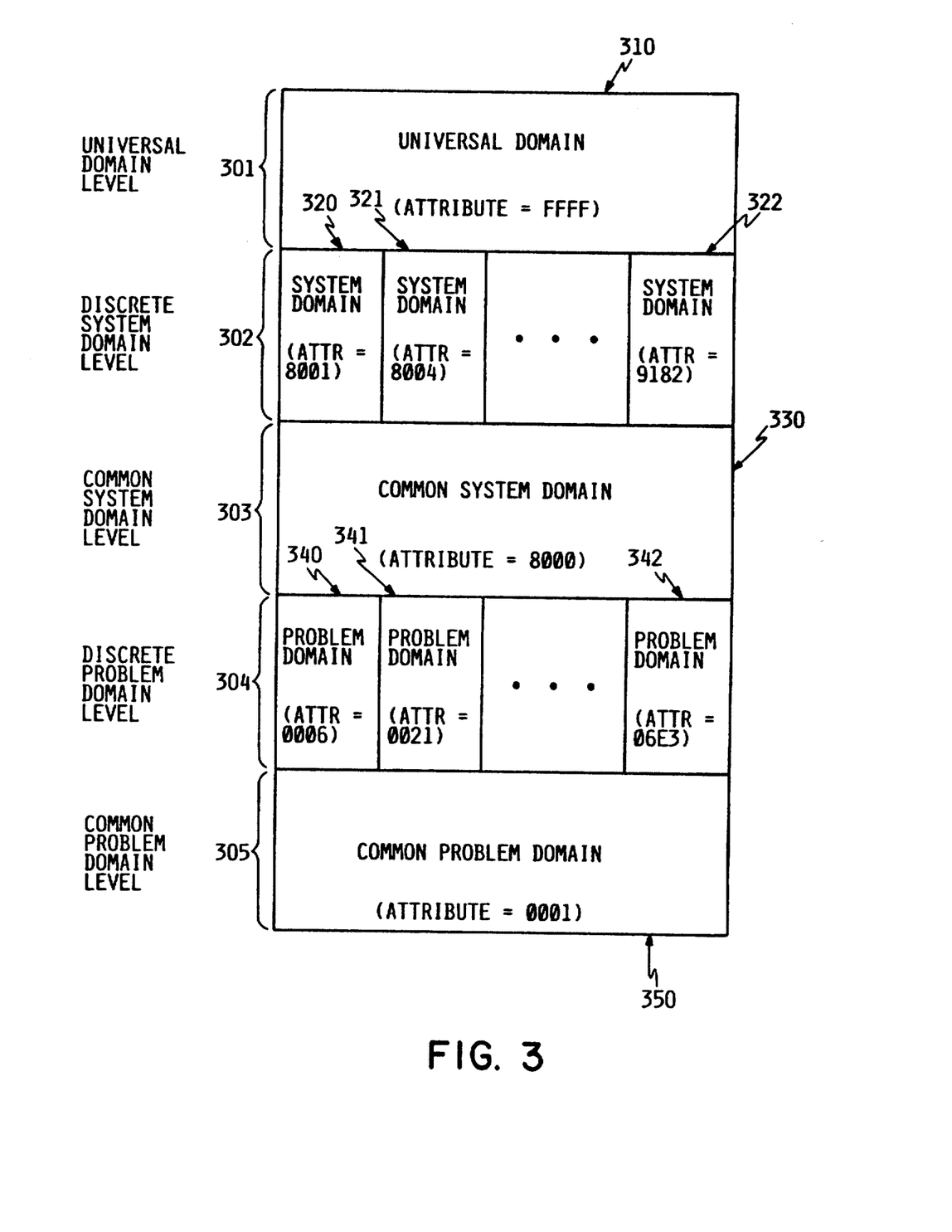
FIG. 3 is a diagram of the hierarchical protection domain levels and domains according to the preferred embodiment of this invention.

Conceptually, this invention establishes a plurality of protection domains and hierarchical protection domain levels as shown in FIG. 3. Each domain occupies a single hierarchical level, although more than one domain may occupy that level. Each object contained on the system is contained in a protection domain, and each task operating on the system executes in a protection domain. The protection domain levels are hierarchical in the sense that any task executing in a protection domain occupying level N can access any object located in a protection domain occupying a level less than N. Conversely, the task may not access any object located in a protection domain occupying a level greater than N. Within the same hierarchical level N, the task may access objects contained in the domain in which it is executing, but may not access objects contained in other domains at that level.

In the preferred embodiment, there are five protection domain levels as shown in FIG. 3. The highest level 301 is occupied by a single universal domain 310. This domain consists of all objects with the domain attribute FFFF (hex). The universal domain is reserved for the most basic and protected operating system functions. Objects with this domain attribute have the most restrictive access, while tasks executing in this domain have universal access to objects throughout the system. The fourth level 302, designated the discrete system domain level, comprises a plurality of discrete system domains 320, 321, 322, represented by domain attributes between 8001 and FFFE (hex). With this range of domain attributes, it is possible to define as many as 32,574 separate domains at this level; however, generally far fewer than this number of domains would actually be used. This level is intended primarily for system tasks and data that require protection from most users, but do not require universal access to basic system functions.

The third level 303, the common system domain level, is occupied by a single domain 330 designated the common system domain, having a domain attribute of 8000 (hex). This domain is intended primarily for data that is shared among tasks executing in the discrete system domain level, such as a system stack or heap. The second level 304, the discrete problem domain level, comprises a plurality of discrete problem domains 340, 341, 342, represented by domain attributes between 0002 and 7FFF (hex). As in the case of the discrete system domain level, it is possible to define a large number of separate domains, but generally only a small fraction will actually be used. The discrete problem domain level is intended for user tasks and data, which the user wishes to protect from access by other tasks. The lowest level 305 is the common problem domain level, which is occupied by a single domain 350 designated the common problem domain, having a domain attribute of 0001 (hex). This level is intended for data, including procedures, to which all tasks should have access.

In the preferred embodiment, each object includes a 2-byte domain attribute. The domain attribute defines the domain to which the object belongs. The domain itself is a conceptual entity, which does not occupy specific address locations in memory. A domain is simply the collection of all objects with a particular domain attribute.

Domain register 103 contains the domain attribute of the currently executing task, identifying the domain in which the task is executing. A task is simply a process, which may require the calling and execution of multiple procedures (sets of machine instructions) located within different objects and different domains. The domain in which the task is executing is not fixed, but can change as different procedures are called and exited. Each procedure's code contains an execution domain attribute 224, specifying the domain in which the procedure executes. This execution domain attribute 224 is not necessarily the same as the domain attribute 222 of the object containing the procedure's machine-readable instructions.

When a task calls a new procedure, it must be able to access the procedure's machine-readable instructions just as it must be able to access any other data it needs. Therefore, the instructions which make up the procedure being called must be contained in an object to which the task has access. Access to an object containing a procedure is permitted under the same conditions as access to an object containing any other data, as described above. If access to the procedure is allowed, the execution domain attribute contained in the procedure (not necessarily the same as the domain attribute of the object containing the procedure) is loaded into domain register 103. The procedure will therefore execute in the domain specified by its execution domain attribute. The domain attribute value previously in domain register 103 is saved on a secure stack along with other state variables required to continue task execution upon return from the procedure being called. Upon return from the procedure, the domain attribute value saved on the stack is restored to the domain register. An execution domain attribute of 0000 (hex), stored in a procedure, indicates domain inheritance. In this case, the procedure will execute in the domain of the task that called it. When such a procedure is invoked, the stored execution domain of 0000 (hex) directs the system to make no change to the value in the domain register.

Because access to a procedure is governed by one attribute (the domain attribute of the object containing the procedure) and the access to data a procedure will have when executing is governed by another (the execution domain attribute stored in the procedure), considerable flexibility is provided. For example, a relatively basic system procedure, which is required by users from time to time, can be stored in an object in the common problem domain, thus permitting universal access, while having a higher level execution domain attribute to access the needed data structures, such as a system stack. The use of the inherited execution domain attribute (0000 hex) allows even greater flexibility and supports more generic procedures.

Figure 4:
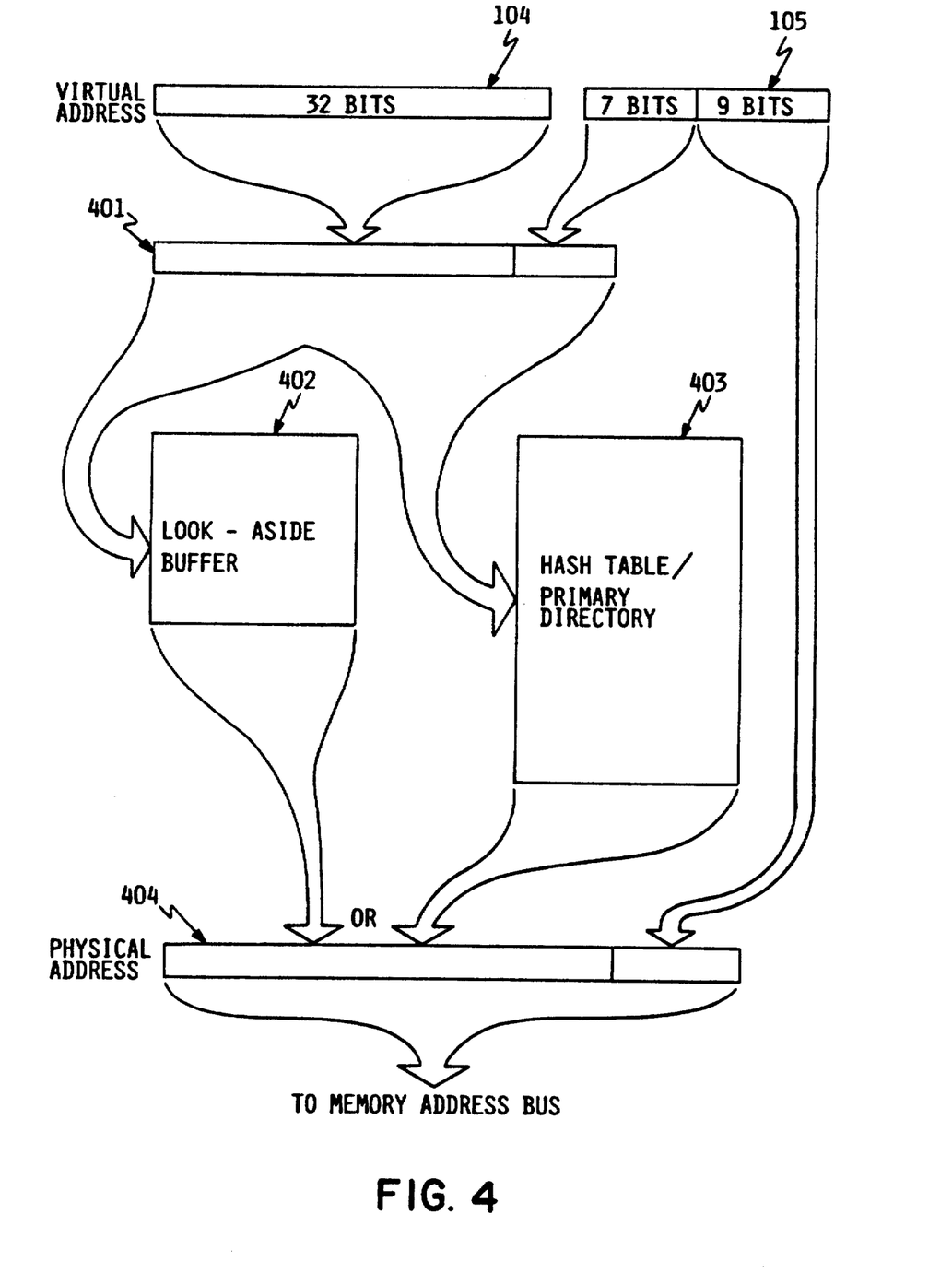
FIG. 4 shows the derivation of an address from base and offset registers according to the preferred embodiment.

When the CPU executes an instruction referencing memory, the virtual address of the operand is held in base register 104 and offset register 105. Base register 104 is a 32-bit register holding the high-order address bits which identify the segment containing the address. Offset register 105 is a 16-bit register holding the low-order address bits, identifying the offset of the address within the segment. Offset register 105 can be loaded independently of base register 104. The virtual address stored in registers 104 and 105 is translated to a physical address in system memory as shown in FIG. 4. The 32 bits of base register 104 and high-order 7 bits of offset register 105 form a 39-bit identifier 401 which is used to select a page (512 bytes) of system memory containing the data. The most recently referenced pages are kept in look-aside buffer 402; entries not contained in look-aside buffer 402 are accessed via a hash table to primary directory 403 containing page entries in system memory. If no entry is found for the 39 high-order virtual address bits in either the lookaside buffer or primary directory, a page fault occurs and the page is brought into system memory 110 from storage 122, 123. The page address is concatenated with the low-order 9 bits of offset register 105 to produce physical memory address 404, which is transmitted via memory address bus 111 to system memory 110.

When a memory reference is made outside the current virtual memory segment (identified by the value in base register 104), a new segment value must be loaded in base register 104. An instruction called Load/Verify Tags (LVT) simultaneously loads the new segment value in the base register and performs certain verification functions. According to the preferred embodiment of this invention, one of the functions performed by the processor when the LVT instruction is executed is the verification of access authority. As noted previously, all addresses within a given segment belong to the same object, and therefore are subject to the same access conditions. By verifying access rights when the LVT instruction is executed, access is verified for the entire segment identified by the new value being loaded in the base register. It is then possible to make multiple memory references within the same segment, without verifying access rights again.

The verification of access rights once for each segment, rather than with each memory reference, not only improves system performance, but permits a more complex domain structure. A system which verifies each memory reference is confined to a more simple domain structure. Prior art domain structures which are either discrete or hierarchical require a single arithmetic operation to verify access rights. The present invention includes multiple discrete domains at multiple hierarchical levels, which require more than one arithmetic operation for access verification. Because access verification is performed only once for each segment, a multi-step verification process is feasible.

Figure 5:
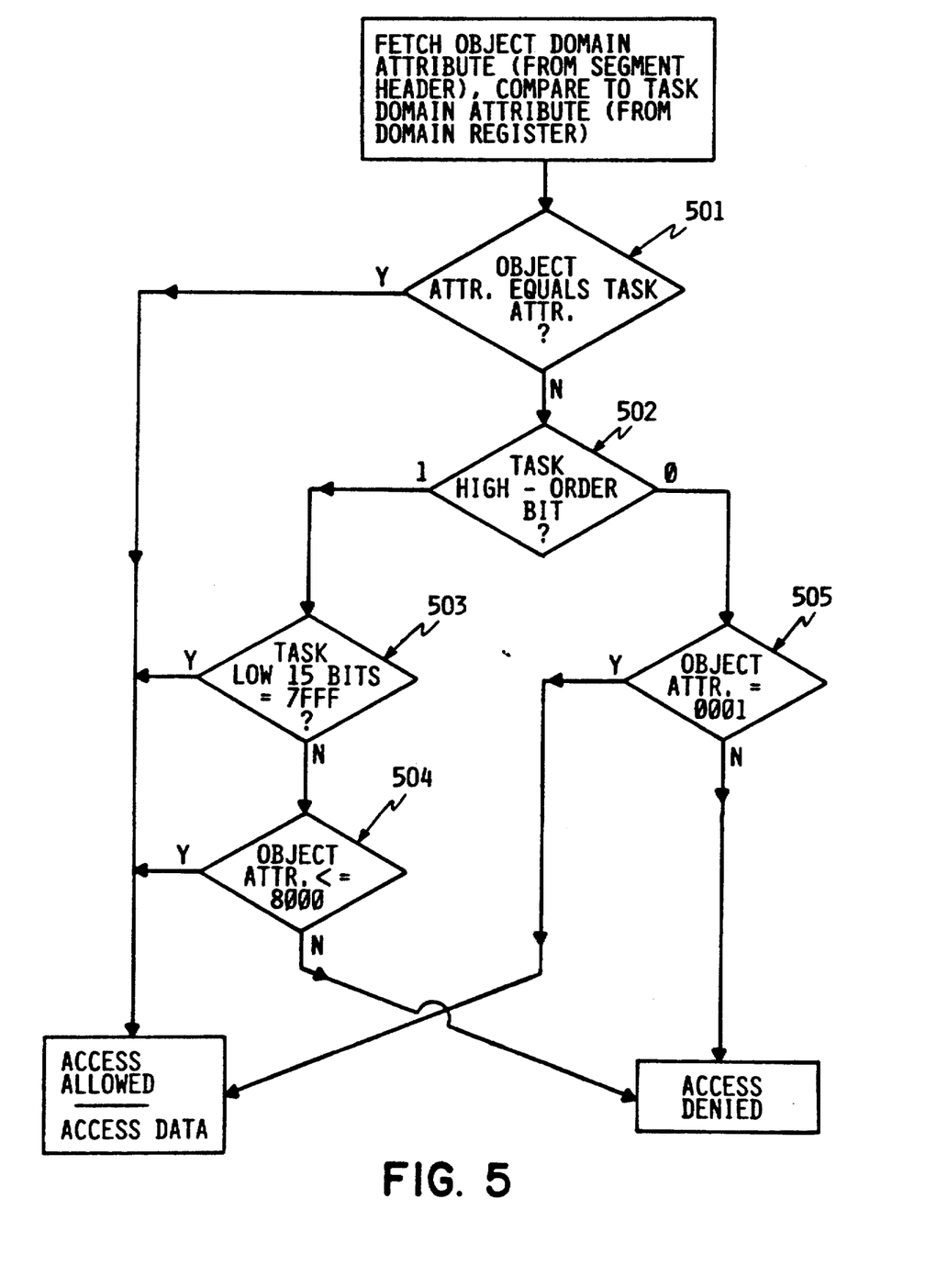
FIG. 5 is a decision tree showing the steps involved in determining whether to grant access.

FIG. 5 is a decision tree showing the steps required in determining whether the currently executing task may access an address contained in an object. The domain attribute of the task, stored in domain register 103, is compared with the domain attribute of the object. If the two domain attributes are equal 501, access is permitted. If not, the high-order bit of the task attribute is examined 502. If the high-order bit of the task attribute is 1, and the 15 low-order bits are compared to 7FFF (hex) at 503, and if equal, access is permitted. If not equal, the object attribute is compared to 8000 (hex) at 504. If less than or equal to 8000 (hex), access is permitted; otherwise it is denied. If the high order bit of the task attribute examined at 502 is 0, the object attribute is compared to 0001 (hex) at 505. If equal, access is permitted; otherwise it is denied. The decision tree of FIG. 5 is only one method of implementing access verification according to this invention, and those skilled in the art will appreciate that many alternative decision trees exist.

In the preferred embodiment, the decision tree of FIG. 5 is implemented in system microcode, 107. Implementing the decision tree in microcode permits greater flexibility in design and later modification. Furthermore, because access is verified only when the current virtual memory segment changes, rather than with each memory reference, the performance impact of a microcoded implementation is minimal. As an alternative embodiment, such a decision tree could have been implemented in hardware. Common techniques known to those skilled in the art are used for implementing such a decision tree in microcode or in hardware.

The use of domains as described herein to enforce object integrity permits direct references to data contained within objects. With this invention, it is possible, e.g., for procedures written in pointer-based computer languages to directly access such data, without invoking a call-level interface procedure to access the object. The call-level interface to objects in the system can still exist, even though the system has a domain structure as described herein. The existence of the direct data access alternative of this invention improves the performance of certain procedures.

While in the preferred embodiment, five hierarchical protection domain levels are established, three of which are occupied by single respective protection domains, this invention could be practiced with a greater or lesser number of levels and domains. For example, in one alternative embodiment there could be three levels, the first and third being occupied by single domains, with the middle level being occupied by multiple discrete domains. Nor is it required that common levels (occupied by a single domain) be interleaved with levels occupied by multiple discrete domains. In another alternative embodiment, there could be three or more levels, the highest of which is a common level for system functions requiring universal access, the remaining levels being occupied by multiple discrete domains.

Although a specific embodiment of the invention has been disclosed along with certain alternatives, it will be recognized by those skilled in the art that additional variations in form and detail may be made within the scope of the following claims.

What is claimed is:

1. A computer system having data contained in a plurality of objects, said computer system comprising:
   data storage means for storing said plurality of objects in said computer system;
   task execution means for executing a plurality of tasks requiring access to data contained in said objects;
   wherein a plurality of hierarchical protection domain levels and a plurality of protection domains are defined for said computer system, each of said protection domains occupying one of said hierarchical levels, wherein at least the of said protection domains occupy the same hierarchical level, wherein each of said tasks executing in said system is executing in one of said protection domains and each object stored in said system is contained in one of said protection domains;
   access verification means, responsive to an attempt to access data by said task execution means, for determining whether a task being executed by said task execution means may access data contained in an object, wherein said access verification means determines that the task may access the data if either of the following two conditions is met;
   (a) the protection domain in which the task is executing is the domain containing the object, or
   (b) the protection domain in which the task is executing occupies a higher hierarchical level than the domain containing the object; and
   means, responsive to said access verification means and coupled to said data storage means, for accessing said data.

2. The computer system of claim 1,
   wherein a domain attribute is associated with each domain; and
   wherein said access verification means comprises means for comparing the domain attribute associated with the domain in which the task is executing with the domain attribute associated with the domain containing the object to determine whether the task may access the data.

3. The computer system of claim 1, wherein each object stored in said computer system contains a domain attribute identifying a domain, and wherein the protection domain containing said object is defined to be the domain identified by said domain attribute.

4. The computer system of claim 3, wherein each task executing in said computer system is associated with a domain attribute identifying a domain, and wherein said means for determining whether a task may access data contained in an object further comprises means for comparing the domain attribute associated with the task with the domain attribute contained in the object to determine whether the task may access the data.

5. The computer system of claim 4, further comprising means supporting said task execution means for changing the domain attribute associated with a task during execution of said tank.

6. The computer system of claim 5,
   wherein at least some of said objects contain data comprising procedures;
   wherein an execution domain attribute is associated with each of said procedures; and
   wherein said means for changing the domain attribute associated with a task comprises means for substituting the execution domain attribute associated with a procedure for the domain attribute associated with a task when said task calls said procedure.

7. The computer system of claim 1,
   wherein said computer system has an address space divisible into segments, each segment comprising a plurality of address locations;
   wherein each said object comprises one or more said segments;
   wherein said means for determining whether a task may access data contained in an object makes such determination in response to a request to access a first data location within a segment contained in said object; and
   wherein said means for accessing data contained in an object comprises means for directly accessing data contained in a second data location within said segment subsequent to accessing said first data location without said means for determining whether a task may access data contained in an object.

8. The computer system of claim 1, wherein the lowest of said hierarchical protection domain levels is occupied by a single protection domain.

9. The computer system of claim 1, wherein at least two of said hierarchical protection domain levels are each occupied by more than one protection domain.

10. A method for controlling access to data contained in objects stored in a computer system by tasks executing in said system, the steps of said method being performed on said computer system, said method comprising the steps of:
    associating a protection domain with each object stored in said computer system;
    associating a protection domain with each task executing in said system;
    wherein a plurality of hierarchical protection domain levels and a plurality of protection domains are defined for said computer system, each of said protection domains occupying one of said hierarchical levels, wherein at least two of said protection domains occupy the same hierarchical level;
    determining whether a task executing in said system may access data contained in an object stored in said system, wherein said determining step determines that the task may access the data if either of the following two conditions is met, and that the task may not access the data if neither condition is met:
    (a) the protection domain associated with the task is the same as the protection domain associated with the object, or
    (b) the protection domain associated with the task occupies a higher hierarchical level than the protection domain associated with the object; and
    accessing said data in response to the results of said step of determining whether a task may access data.

11. The method for controlling access to data contained in objects of claim 10.
    wherein said step of associating a protection domain with each object associates a domain attribute with each object;
    wherein said step of associating a protection domain with each task associated a domain attribute with each task; and
    wherein said step of determining that a task may access data contained in an object comprises the step of comparing the domain attribute associated with the task with the domain attribute associated with the object.

12. The method for controlling access to data contained in objects of claim 10, wherein only one protection domain occupies the lowest of said hierarchical protecting domain levels.

13. The method for controlling access to data contained in objects of claim 10, wherein a first and a second protection domain occupy one of said hierarchical protection domain levels, and a third and a fourth protection domain occupy another of said hierarchical protection domain levels.

14. An apparatus for controller access to data stored in a computer system by tasks executing in said system, said apparatus comprising:
   means for associating with each tack executing in said system a protection domain, whereby said task executes in said protection domain associated therewith;
   means for associating with each data location in said system a protection domain, whereby said data location is contained in said protection domain associated therewith;
   wherein a plurality of hierarchical protection domain levels and a plurality of protection domains are defined for said computer system, each of said protection domains occupying one of said hierarchical levels, wherein at least two of said protection domains occupy the same hierarchical levels, wherein the lowest hierarchical level is occupied by a single domain; and
   access verification means for determining whether a task being executed in said system may access a data location, said access verification means being coupled to said means for associating with each task a protection domain and to said means for associating with each data location a protection domain, wherein said access verification means determines that the task may access the data if either of the following two conditions is met;
   (a) the protecting domain in which the task is executing is the domain containing the data, or
   (b) the protection domain in which the task is executing occupies a higher hierarchical level then the domain containing the data.

15. The apparatus for controlling access to data of claim 14
   wherein each said data location is associated with a domain attribute identifying the protection domain containing the data;
   wherein each said task executing in said system is associated with a domain attribute identifying the protection domain containing the task; and
   wherein said access verification means comprises means for comparing the domain attribute associated with said data location to the domain attribute associated with said task to determine whether the task may access the data location.

16. The apparatus for controlling access to data of claim 15, wherein said means for associating with each task a protection domain comprises means for changing the domain attribute associated with a task during execution of said task.

17. The apparatus for controlling access to data of claim 16
   wherein said system further includes a plurality of procedures stored at data locations;
   wherein an execution domain attribute is associated with each of said procedures; and
   wherein said means for changing the domain attribute associated with a task comprises means for substituting the execution domain attribute associated with a procedure for the domain attribute associated with a task when said task calls said procedure.

18. The apparatus for controlling access to data of claim 14,
   wherein said computer system has an address space divisible into segments, each segment comprising a plurality of data locations for storing data;
   wherein all address locations within any one segment are contained in the same protection domain;
   wherein said means for determining whether a task may access a data location makes such determination in response to a request to access a first data location within a segment; and
   wherein said apparatus further comprises means for directly accessing a second data location within said segment subsequent to accessing said first data location without said means for determining whether a task may access an a data location.

19. An apparatus for controlling access to data stored in a computer system by tasks executing in said system, said apparatus comprising:
   means for associating with each task executing in said system a protection domain, whereby said task executes in said protection domain associated therewith;
   means for associating with each data location in said system a protection domain, whereby said data location is contained in said protection domain associated therewith;
   wherein a plurality of hierarchical protection domain levels and a plurality of protection domains are defined for said computer system, each of said protection domains occupying one of said hierarchical levels, and wherein a first said protection domain and a second said protection domain occupy one of said hierarchical levels, and a third said protection domain and a fourth said protection domain occupy another of said hierarchical levels; and
   access verification means for determining whether a task being executed in said system may access a data location, said access verification means being coupled to said means for associating with each task a protection domain and to said means for associating with each data location a protection domain, wherein said access verification means determines that the task may access the data if either of the following two conditions is met:
   (a) the protection domain in which the task is executing is the domain containing the data, or
   (b) the protection domain in which the task is executing occupies a higher hierarchical level than the domain containing the data.

20. The apparatus for controlling access to data of claim 19,
   wherein each said data location is associated with a domain attribute identifying the protection domain containing the data;
   wherein each said task executing in said system is associated with a domain attribute identifying the protection domain containing the task; and wherein said access verification means comprises means for comparing the domain attribute associated with said data location to the domain attribute associated with said task to determine whether the task may access the data location.

21. The apparatus for controlling access to data of claim 20, wherein said means for associating with each task a protection domain comprises means for changing the domain attribute associated with a task during execution of said task.

22. The apparatus for controlling access to data of claim 21,
wherein said system further includes a plurality of procedures stored at data locations;
wherein an execution domain attribute is associated with each of said procedures; and
wherein said means for changing the domain attribute associated with a task comprises means for substituting the execution domain attribute associated with a procedure for the domain attribute associated with a task when said task calls said procedure.

23. The apparatus for controlling access to data of claim 19,
wherein said computer system has an address space divisible into segments, each segment comprising a plurality of data locations for storing data;
wherein all address locations within any one segment are contained in the same protection domain;
wherein said means for determining whether a task may access a data location makes such determination in response to a request to access a first data location within a segment; and
wherein said apparatus further comprises means for directly accessing a second data location within said segment subsequent to accessing said first data location without said means for determining whether a task may access a data location.

24. An apparatus for controlling access to data stored in a computer system by tasks executing in said system, said computer system having an address space divisible into segments, said apparatus comprising:
means for associating a domain attribute with each segment of addresses contained in said computer system, said domain attribute identifying a protection domain in which said segment is contained;
means for associating a domain attribute with each task executing in said computer system, said domain attribute identifying a protection domain in which the task is executing;
wherein a plurality of hierarchical protection domain levels and a plurality of protection domains are defined for said computer system, each of said protection domains occupying one of said hierarchical levels, wherein at least two of said protection domains occupy the same hierarchical level, and wherein each of said tasks executing in said system is executing in one of said protection domains and each segment of addresses stored in said system in contained in one of said protection domains;
access verification means for comparing the domain attribute of a task being executed in said system with the domain attribute of a segment to determine whether said task may access a first data location contained in said segment, wherein said access verification means determines that the task may access said data if either of the following two conditions is met;
(a) the domain attributed associated with the task equals the domain attribute associated with the segment, or
(b) the domain identified by the domain attribute associated with the task occupies a higher hierarchical level than the domain identified by the domain attribute associated with the segment; and
means, coupled to said means for comparing the domain attributes, for directly accessing a second data location contained in said segment subsequent to accessing said first data location without comparing said domain attributes.

25. The apparatus for controlling access to data of claim 24, wherein the lowest of said hierarchical protection domain levels is occupied by a single protection domain.

26. The apparatus for controlling access to data of claim 24, wherein at least two of said hierarchical protection domain levels are each occupied by more than one protection domain.

* * * * *

UNITED STATES PATENT AND TRADEMARK OFFICE
CERTIFICATE OF CORRECTION

PATENT NO. : 5,280,614

DATED : January 18, 1994

INVENTOR(S) : Steven J. Munroe, James G. Ranweiler, George D. Timms, Jr.

It is certified that error appears in the above-identified patent and that said Letters Patent is hereby corrected as shown below:

IN THE CLAIMS:

Claim 1, Column 9, Line 11 - replace "the" with --two--

Claim 5, Column 9, Line 57 - replace "tank" with --task--

Claim 11, Column 10, Line 64 - replace "associated" with --associates--

Claim 12, Column 11, Line 6 - replace "protecting" with --protection--

Claim 14, Column 11, Line 13 - replace "controller" with --controlling--

Claim 14, Column 11, Line 16 - replace "tack" with --task--

Claim 14, Column 11, Line 29 - replace "levels" with --level--

Claim 24, Column 14, Line 26 - replace "attributed" with --attribute--

Signed and Sealed this

Fourteenth Day of June, 1994

*Attest:*

BRUCE LEHMAN

*Attesting Officer*   *Commissioner of Patents and Trademarks*